United States Patent [19]

McRae

[11] Patent Number: 5,389,169
[45] Date of Patent: Feb. 14, 1995

[54] METHOD OF AND APPARATUS FOR REMOVING A SOFTENABLE COVER FROM A GOLF BALL

[76] Inventor: Corbett McRae, 6462 Finch Ave. West, Unit 155, Rexdale, Ontario, Canada, M9V 1T4

[21] Appl. No.: 198,760

[22] Filed: Feb. 18, 1994

[51] Int. Cl.⁶ .............................................. B32B 35/00
[52] U.S. Cl. ..................................... 156/98; 156/344; 156/584; 264/36
[58] Field of Search ................... 156/344, 584, 94, 98, 156/146; 264/36

[56] References Cited

U.S. PATENT DOCUMENTS 3,268,634  8/1966  Glaser ................................... 264/36
4,234,184  11/1980  Deleens et al. ................. 156/146 X

*Primary Examiner*—Mark Osele
*Attorney, Agent, or Firm*—Bereskin & Parr

[57] ABSTRACT

A method of removing a softenable cover from a golf ball having a softenable outer cover and an inner core, the method comprising the steps of:

(a) heating the golf ball to a temperature above the softening point of the cover;
(b) cutting a portion of the circumference of the cover through substantially its entire thickness; and,
(c) forcing the core through said cut portion.

There is also provided an apparatus for removing a softenable cover from a golf ball having a softenable outer cover and an inner core, the apparatus comprising:

a heater for heating the cover to a temperature above the softening point of the cover;
a blade for cutting a portion of the circumference of the cover through substantially its entire thickness; and,
a plunger for forcing the core through said cut portion.

15 Claims, 11 Drawing Sheets

METHOD OF AND APPARATUS FOR REMOVING A SOFTENABLE COVER FROM A GOLF BALL

FIELD OF THE INVENTION

The present invention relates to a method of and apparatus for removing a softenable cover from a golf ball having a softenable outer cover and an inner core.

BACKGROUND OF THE INVENTION

Most present day golf balls comprise an inner core and an outer cover. The inner core is most commonly a solid homogeneous mass, consisting of polybutadiene, various monomers, fillers and additives. The outer cover is most commonly made of a softenable material, such as natural rubber or a thermoplastic such as Surlyn (trade mark of Du Pont). Also, a winding composed of natural or synthetic rubber thread may be wound around the core, such that the winding is situated between the core and the cover. As used herein, the "core" of a golf ball includes all material below the cover of the ball, such that such windings are considered to be part of the core of the ball.

When golf balls are used repeatedly, as occurs at driving ranges, the cover of the golf ball is often cut or marked by club contact with the ball, by contact of the ball with the ground after being hit, or when the balls are picked up off the range and washed for reuse.

If the cover of a golf ball is cut or marked in this manner, the trajectory of the golf ball will be adversely affected. For example, such imperfections alter the wind resistance of the ball and also may change the ball's centre of gravity and moment of inertia. Thus, golfers who go to a driving range to improve their game will not be able to accurately determine how well they are hitting the ball, due to the cuts, marks and other blemishes on the outer cover of the golf balls.

Currently, if a driving range wishes to maintain its stock of balls in good condition, balls that have been cut or marked must be identified and then replaced. Due to the expense associated with replacing cut balls with new balls, most driving ranges delay replacing cut balls until the covers are severely marked, well after the balls' performance is affected by the cuts and marks.

It is therefore an object of the present invention to provide a method and apparatus for removing a softenable cover from a golf ball so that the inner core may be recovered and reused.

SUMMARY OF THE INVENTION

According to the present invention, there is provided a method of removing a softenable cover from a golf ball having a softenable outer cover and an inner core, the method comprising the steps of:
(a) heating the golf ball to a temperature above the softening point of the cover;
(b) cutting a portion of the circumference of the cover through substantially its entire thickness; and,
(c) forcing the core through said cut portion.

There is also provided a method of recovering a golf ball having a softenable outer cover and an inner core, the method comprising the steps of:
(a) removing the cover from the core by:
 (i) heating the golf ball to a temperature above the softening point of the cover;
 (ii) cutting a portion of the circumference of the cover through substantially its entire thickness;
 (iii) forcing the core through said cut portion; and,
(b) applying a new cover to the core.

Also according to the present invention, there is provided an apparatus for removing a softenable cover from a golf ball having a softenable outer cover and an inner core, the apparatus comprising:
 means for heating the cover to a temperature above the softening point of the cover;
 means for cutting a portion of the circumference of the cover through substantially its entire thickness; and,
 means for forcing the core through said cut portion.

BRIEF DESCRIPTION OF THE DRAWINGS

The present invention can be more clearly understood by reference to the accompanying drawings of a preferred embodiment, in which:

FIGS. 7A–7I are sequential views of the cover being removed from a golf ball by the cutter-clamp of FIG. 6B.

DETAILED DESCRIPTION OF THE PREFERRED EMBODIMENT

Figure 1:
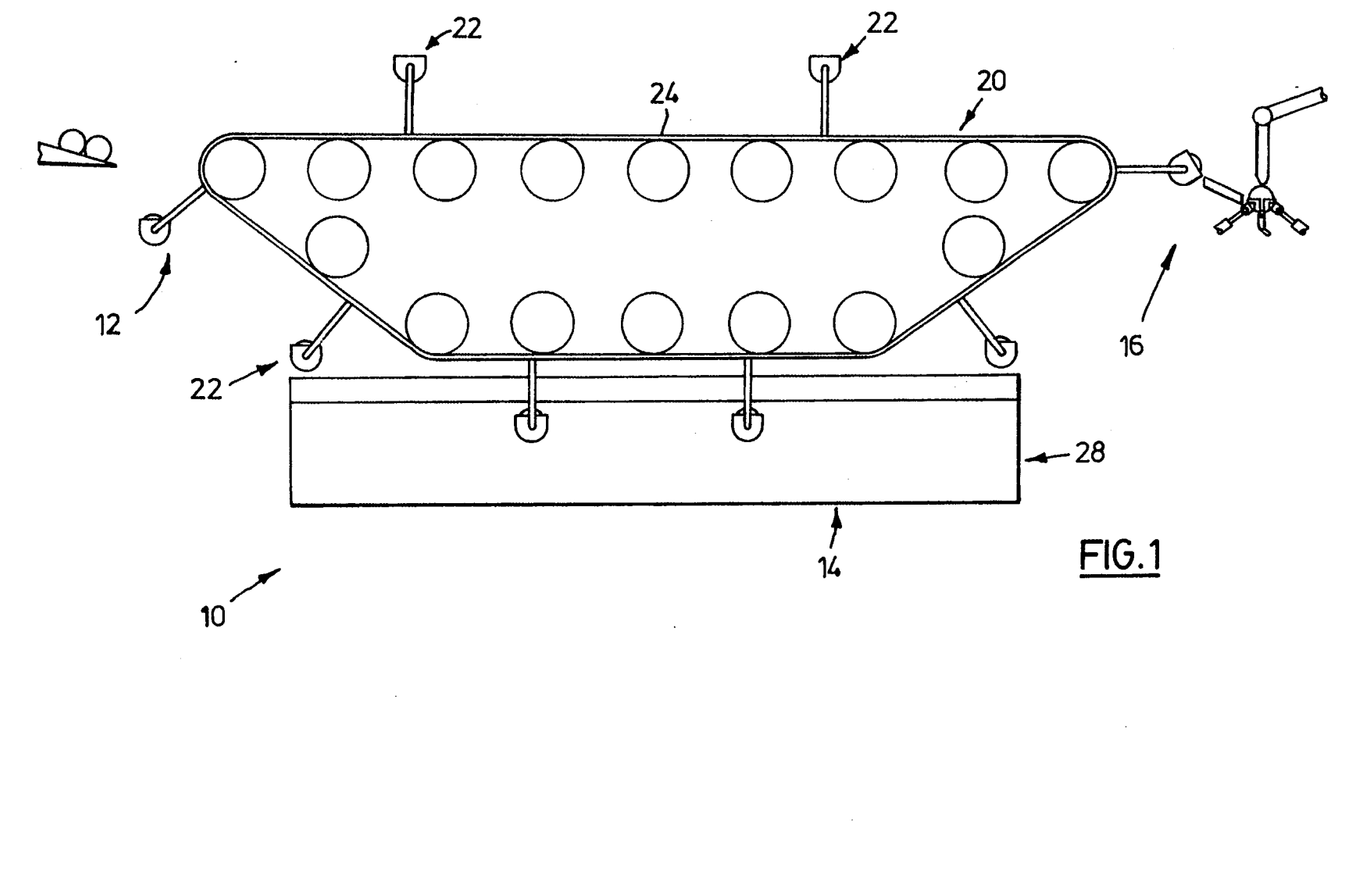
FIG. 1 is a schematic view of an apparatus according to the present invention.
Figure 2:
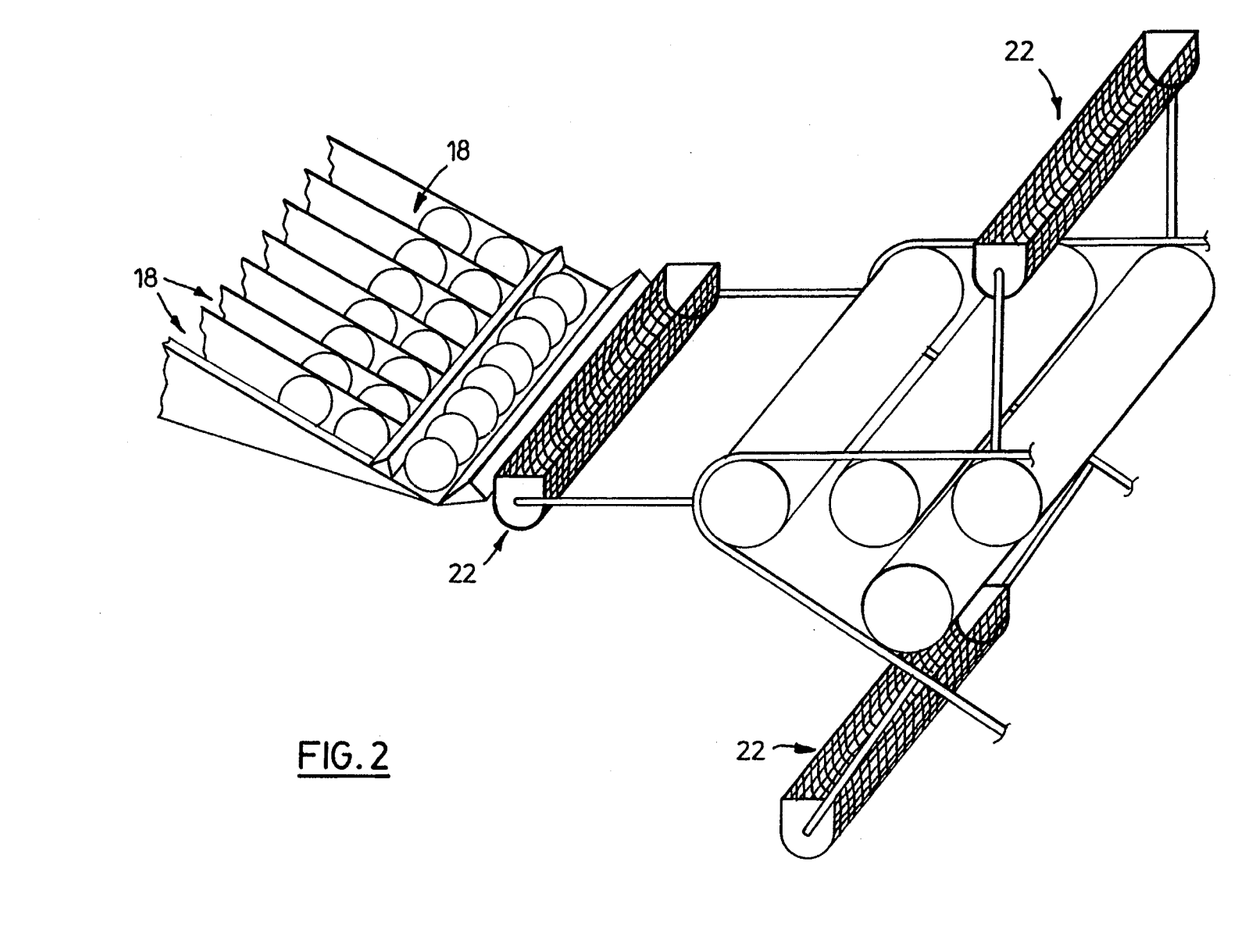
FIG. 2 is a side perspective view of the ball loading zone of the apparatus of FIG. 1.

As shown in FIG. 1, according to the present invention, an apparatus for removing a cover from a golf ball is indicated generally as reference numeral 10. The apparatus 10 comprises a ball loading zone 12, a heating zone 14, a cover stripping zone 16 and a conveyor system 20. In the preferred embodiment, the ball loading zone 12 comprises a plurality of lanes 18, each of which is designed to hold a number of golf balls in a single file relationship, as can be seen in FIG. 2. Alternatively, the ball loading zone 12 may be a single lane, or may be any method of feeding the golf balls to the heating zone 14. The golf balls may be washed to remove surface debris while in or before entering the ball loading zone 12.

The conveyor system 20 carries the golf balls from the ball loading zone 12, through the heating zone 14 to the cover stripping zone 16. The conveyor system 20 comprises a plurality of troughs 22 attached at spaced intervals to a conveyor belt 24. The troughs 22 are preferably of a mesh-type construction, and are sized so as to hold the balls released from the lanes 18.

As shown in FIGS. 3A–3D, the balls are loaded into one of the troughs 22 as the trough passes the ball loading zone 12. Preferably, the lanes 18 are inclined downwardly, so that the golf balls can be gravity loaded into the troughs 22.

Figure 3A:
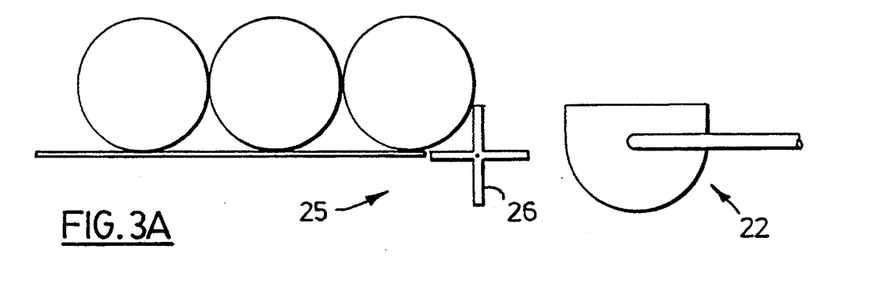
FIGS. 3A–3D are sequential views of balls passing through the ball loading zone of the apparatus of FIG. 1.
Figure 3B:
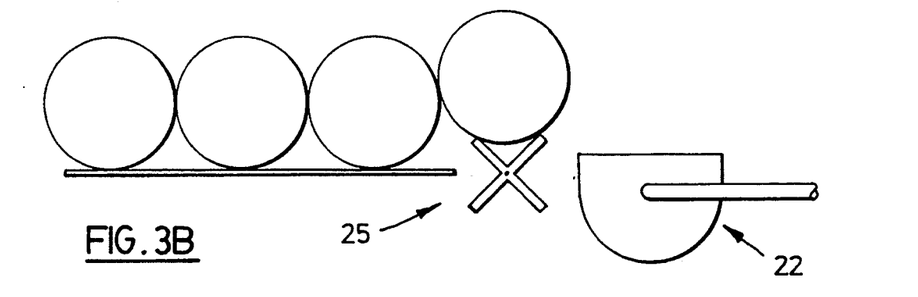
Figure 3C:
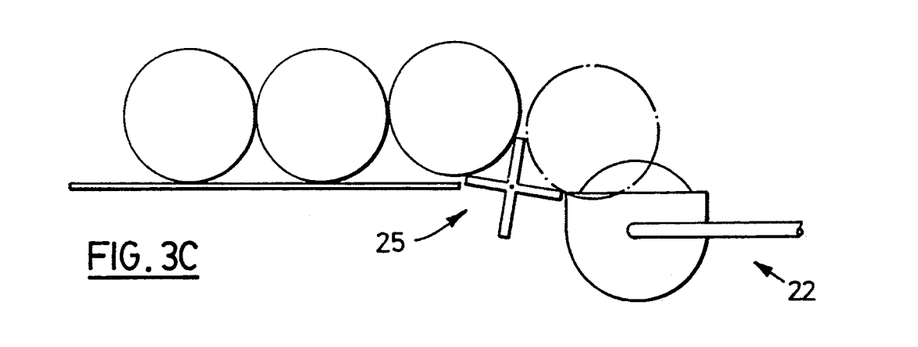
Figure 3D:
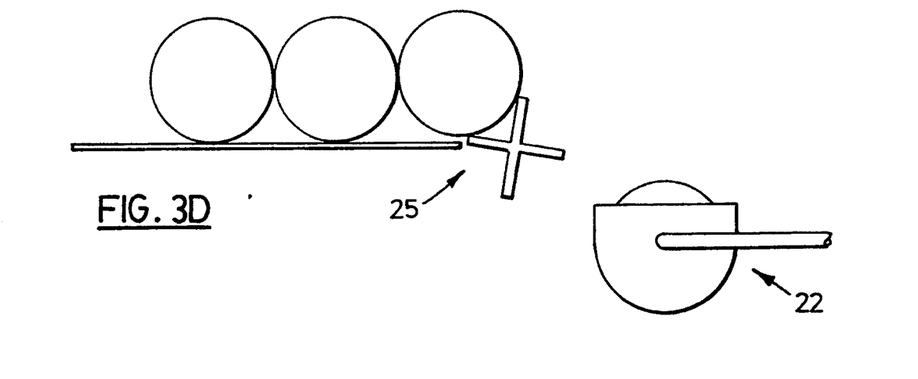

A feed regulator system controls the release of the balls from the lanes 18 into the troughs 22. In the preferred embodiment, the feed regulator system comprises a turnstile 25 having four arms 26, as shown in FIG. 3A. The axis of rotation of the turnstile 25 is parallel to and aligned with the bottom of the lanes 18. As shown in FIGS. 3A-3D, when a trough 22 approaches the lanes 18, the turnstile 25 is activated and begins to rotate, releasing a set of balls, i.e. one from each of the lanes 18, into the trough 22.

Alternatively, the feed regulator system may comprise a feed gate at the end of each lane 18, or any other suitable mechanism for releasing the balls into the approaching trough.

The ball loading process is repeated as each subsequent trough 22 moves into and through the ball loading zone 12.

From the ball loading zone 12, the conveyor belt 24 moves the trough 22 into the heating zone 14. In the preferred embodiment shown in FIG. 4, the heating zone 14 comprises a tank 28, which is preferably filled with a heated fluid, most preferably heated water. The temperature of the water in the tank 28 and the velocity of the troughs 22 through the tank 28 are chosen to ensure that the residence time of the balls in the tank is sufficient to soften the cover of the balls to a pliable state upon exiting the tank 28. Additionally, the cover of the golf ball must remain pliable while the ball is in the cover stripping zone 16. However, overheating the golf ball should be avoided, as the cover then tends to stick to the core, making removal of the cover more difficult. For example, if the water in the heating tank 28 is at a temperature of 200° F., a residence time in the tank 28 of approximately 30 seconds is sufficient.

Alternatively, the heating zone 14 may comprise heat lamps or any other suitable method of heating the covers of the golf balls to a pliable state.

Figure 4:
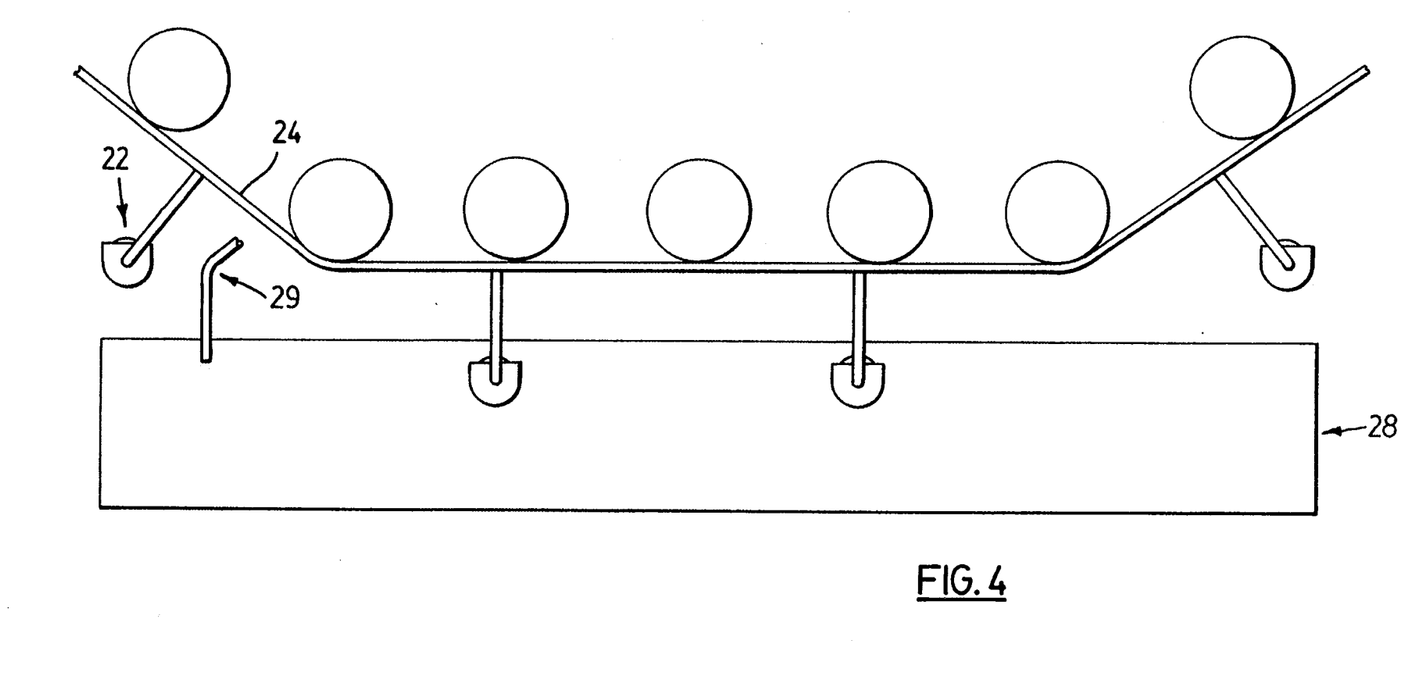
FIG. 4 is a side view of the ball heating zone of the apparatus of FIG. 1.

As discussed above, the troughs 22 are preferably of a mesh-type construction. This allows the water in the tank 28 to fully contact the golf balls when the troughs are submerged in the tank, and also allows the liquid to drain out of the trough 22 and remain in the tank as the trough 22 emerges from the tank 28.

The tank 28 is provided with means to maintain the liquid at the desired temperature, such as a heating element and thermostat controller. Also, the tank 28 preferably includes level control means, preferably a liquid replenishing line 29, to maintain the level of liquid in the tank 28 at a pre-determined level.

Figure 5A:
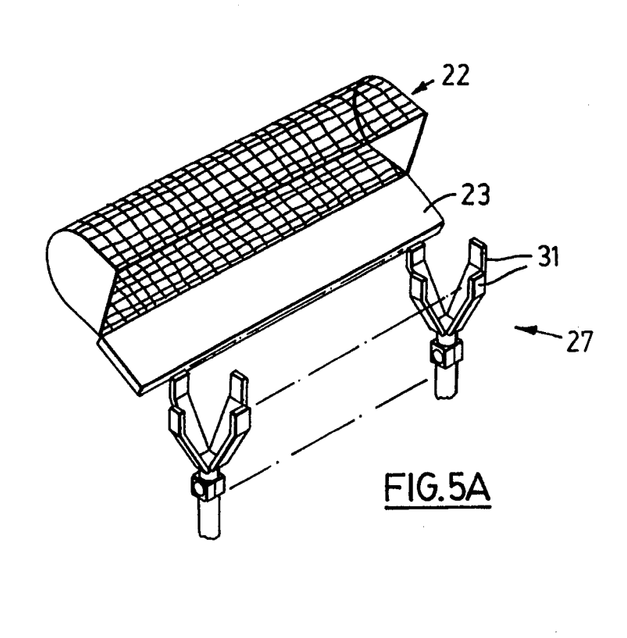
FIG. 5A is a perspective view of a guide plate and positioning arm of the present invention.
Figure 5B:
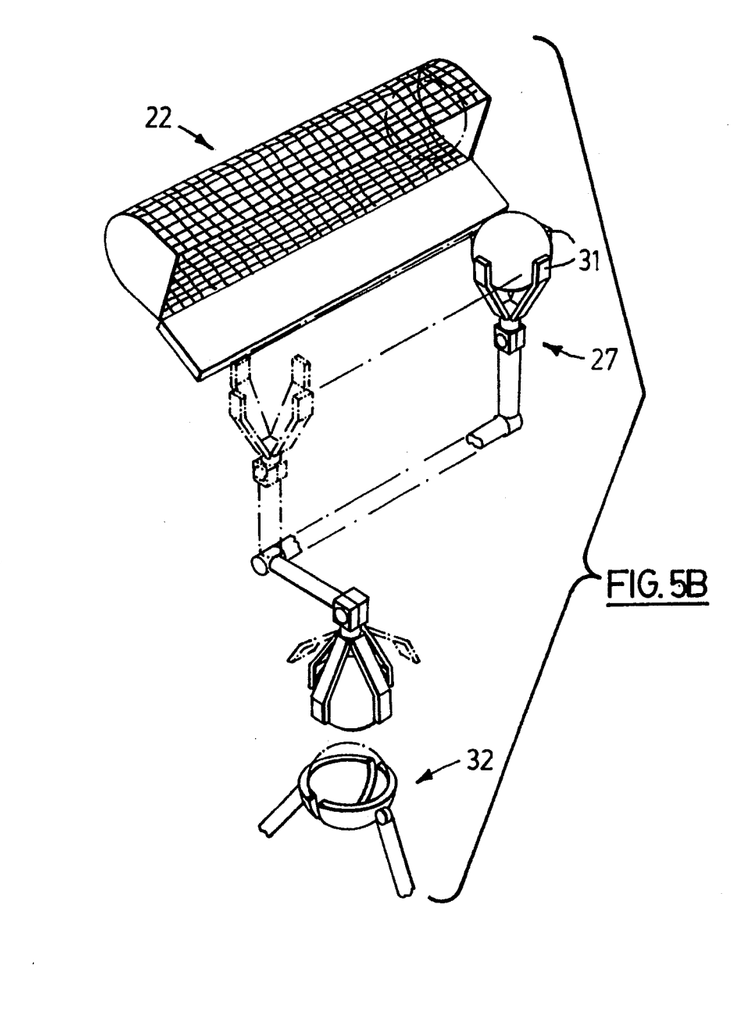
FIG. 5B is a side view of the positioning arm of FIG. 5A placing a ball into a cutter-clamp.

Upon emerging from the heating zone 14, the troughs 22 enter the cover stripping zone 16. As shown in FIG. 5A, the troughs contact a downwardly inclined guide plate or ramp 23, which causes the trough to tilt and the balls to roll out and down the plate 23 to a plurality of positioning arms 27. In the preferred embodiment, each of the arms 27 has four retractable fingers 31. When a ball is tipped into an arm 27, the fingers 31 contract, thereby holding the ball securely in place in the arm 27, as shown in FIG. 5B.

The arm 27 then pivots towards a cutter clamp 32, and once the ball is directly over the cutter clamp 32, the fingers 31 extend, releasing the ball into the cutter clamp 32.

Figure 6A:
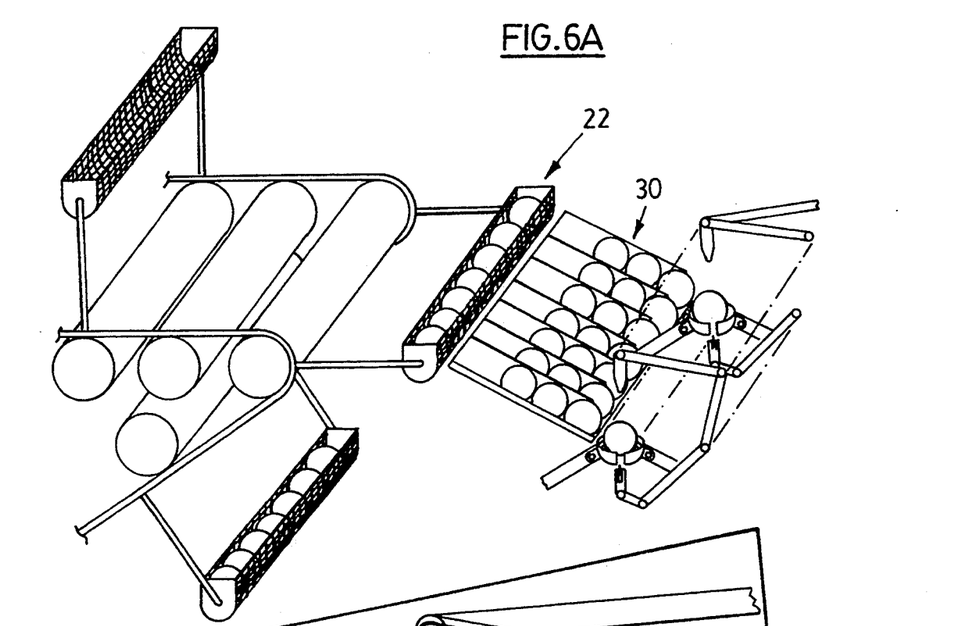
FIG. 6A is a side perspective view of the cover stripping zone of the apparatus of FIG. 1.

Alternatively, the troughs may be tipped to release the balls into a plurality of inclined cutter lanes 30, as is shown in FIG. 6A. Once in a cutter lane 30, the golf ball travels downwardly towards the cutter-clamp 32.

Figure 6B:
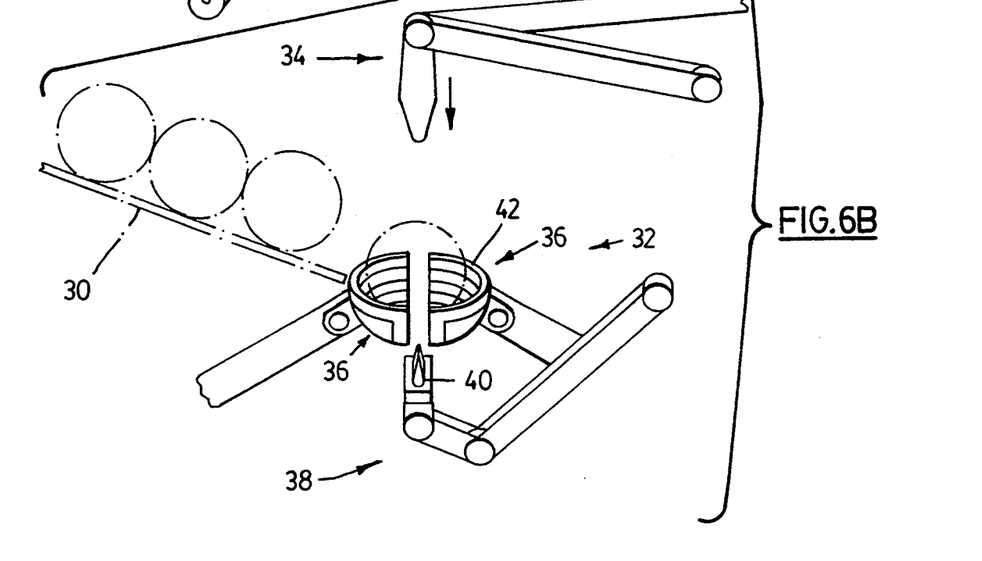
FIG. 6B is a perspective view of one of the cutter-clamps of FIG. 6A.

The cutter-clamp 32 comprises a plunger arm 34, two clamp portions 36 and a cutter arm 38. Attached to one end of the cutter arm 38 is a blade 40. The clamp portions 36 are of a generally quarter spherical shape. The inner surfaces of clamp portions 36 are sized and shaped to fit around a standard golf ball. The inner surfaces of the clamp portions 36 include a plurality of protruding edges 42, the edges 42 being adapted to grip the cover of the golf ball during the removal process.

The procedure for removing the softened cover from the core of the golf ball will now be explained with reference to FIGS. 7A-7I.

Figure 7A:
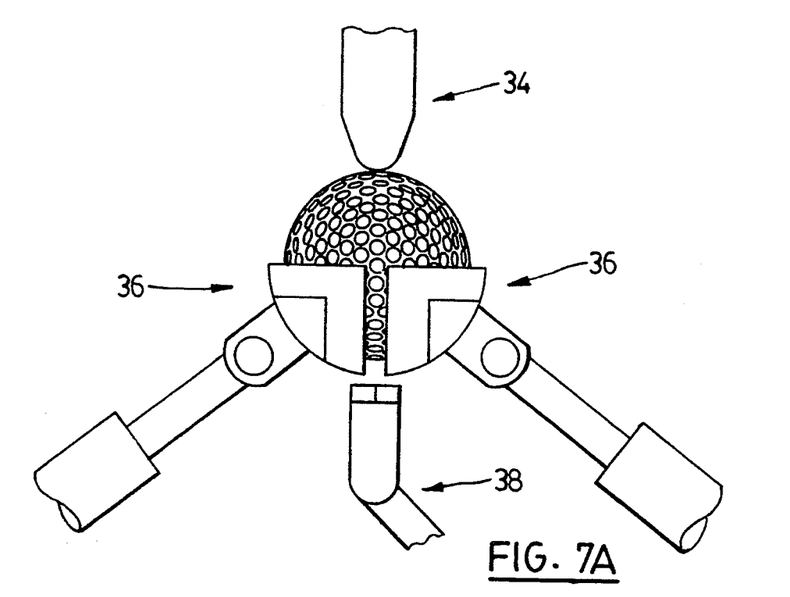
Figure 7B:
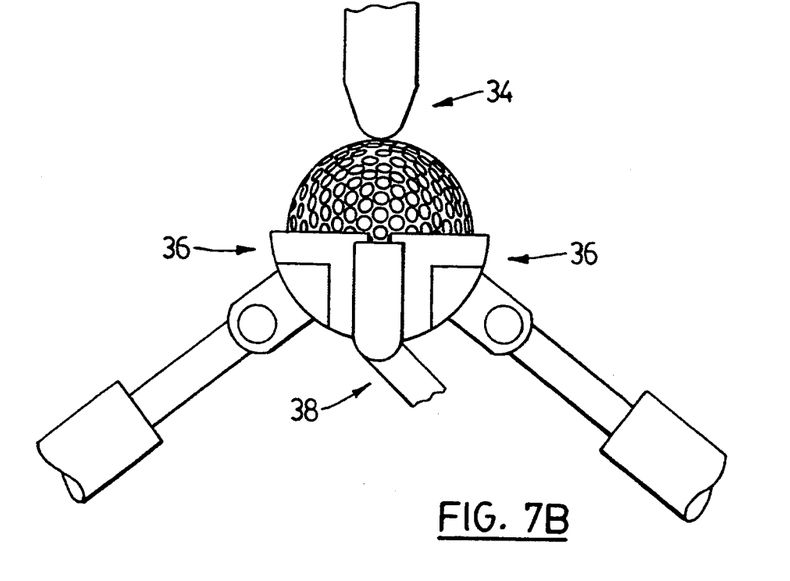
Figure 7C:
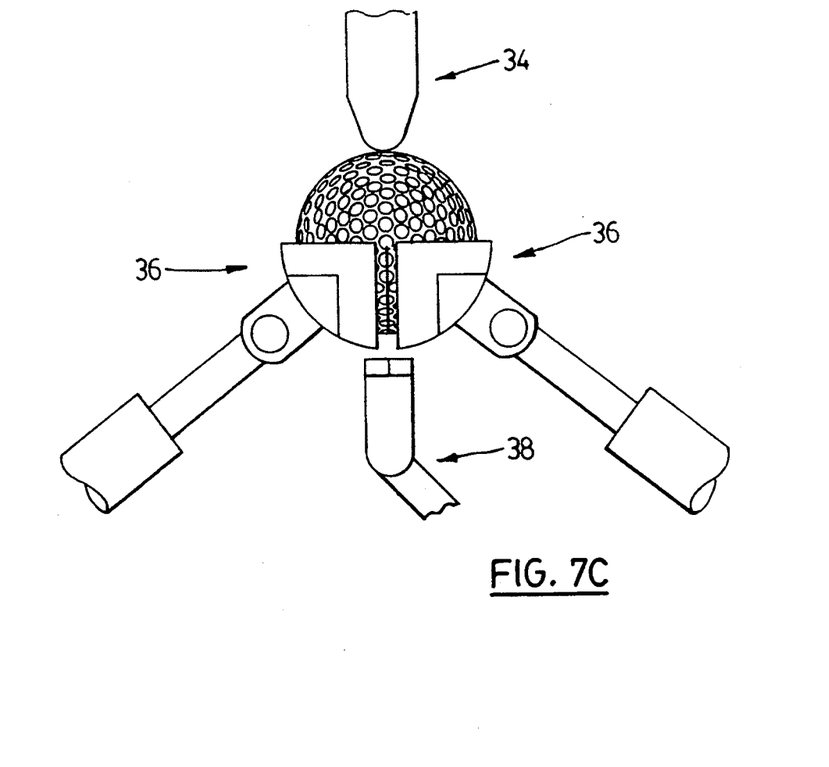
Figure 7D:
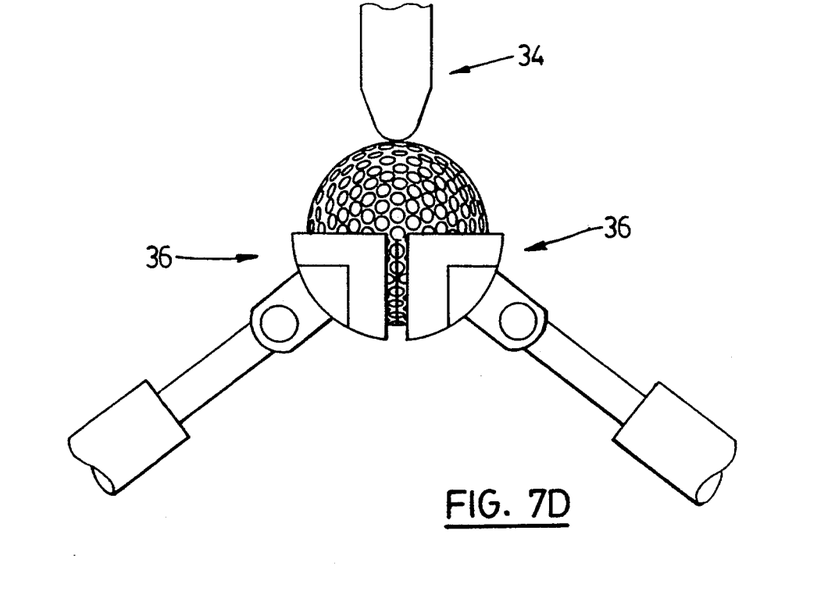
Figure 7E:
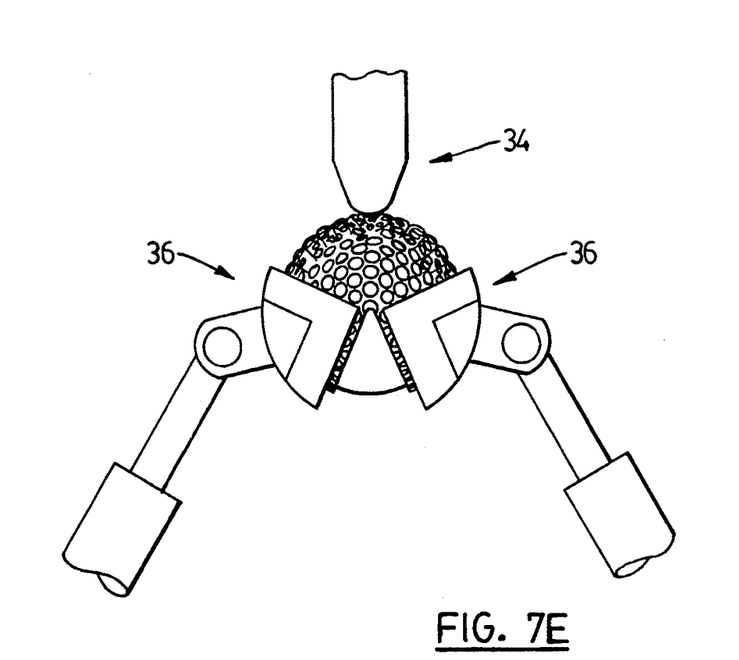
Figure 7F:
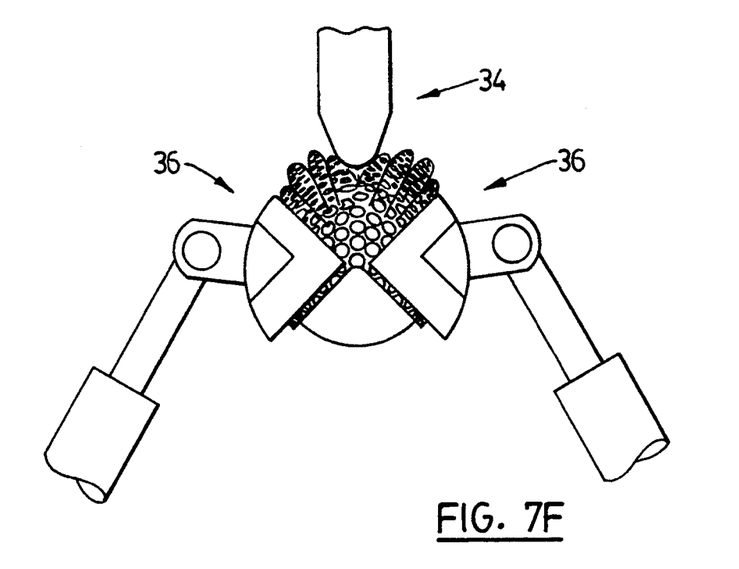
Figure 7G:
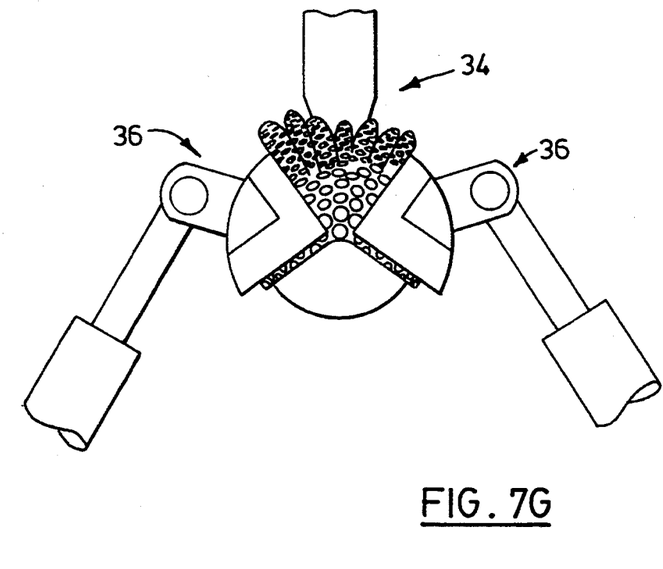
Figure 7H:
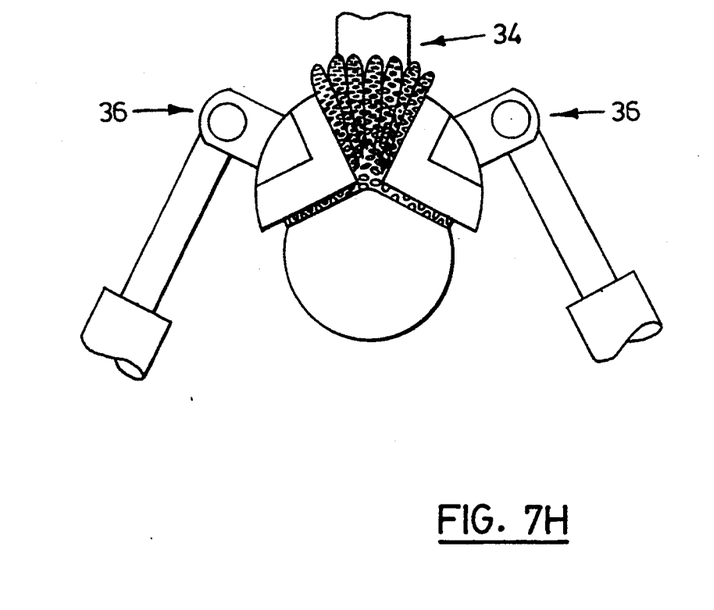

FIG. 7A shows the initial position of the cutter-clamp 32 once a ball is positioned therein. As shown, the clamp portions 36 are initially adjacent one another. The gap between the two clamp portions 36 when in this position allows for the blade 40 to contact and cut a portion of the cover of the ball. Preferably, the blade 40 is concave and has a curvature matching that of the core of a golf ball. The portion of the circumference of the ball cut by blade 40 preferably comprises an arc of at least 90°. Preferably, stop means are provided to prevent the blade 40 from cutting into the core of the golf ball. In the preferred embodiment, blade 40 is positioned on cutter arm 38 such that when the cutter arm 38 abuts the clamp portions 36 as shown in FIG. 7B, the blade 40 will only cut the cover of the ball, and will not cut into the core. Once the cover is cut, cutter arm 38 moves away from the golf ball.

The pressure applied by clamp portions 36 to the ball is regulated so as to allow the cover to be pulled away from the core and to prevent the core from becoming out of round. As shown in FIGS. 7D-7I, the clamp portions 36 move around the golf ball, away from the cut portion. The protruding edges 42 grab the cover and pull it away from the core of the golf ball. The removal of the cover is also assisted by downward pressure applied by plunger arm 34, which forces the core out of the cover.

Preferably, the plunger arm 34, the clamp portions 36 and the cutter arm 38 are hydraulically operated. Alternatively, electrically driven gear mechanisms may be used. In a further embodiment, the clamp portions 36 may be affixed to supports having a coiled spring piston and rod mechanism, in which the spring would provide enough resistance for the clamps to ensure that the cover will be pulled away from the core.

Once the inner core of the golf ball has been fully separated from the cover, the core can be recovered, by injection moulding a new cover around the recycled core, and the ball reused.

While the present invention has been described in accordance with a preferred embodiment, it is to be understood that various changes and modifications may be made to the preferred embodiment while remaining within the scope of the appended claims.

I claim:

1. A method of removing a softenable cover from a golf ball having a softenable outer cover and an inner core, the method comprising the steps of:
   (a) heating the golf ball to a temperature above the softening point of the cover;
   (b) cutting a portion of the circumference of the cover through substantially its entire thickness; and,
   (c) forcing the core through said cut portion.

2. The method of claim 1 wherein said heating step comprises contacting the golf ball with a heated fluid.

3. The method of claim 2 wherein said heated fluid is water.

4. The method of claim 1 wherein said cut portion comprises an arc of at least 90°.

5. The method of claim 1 wherein during said cutting and forcing steps, the golf ball is held by clamp means.

6. The method of claim 5 wherein a concave blade having a curvature substantially that of the core is used in said cutting step.

7. The method of claim 6 wherein stop means prevent said blade from cutting the core of the golf ball.

8. A method of recovering a golf ball having a softenable outer cover and an inner core, the method comprising the steps of:
   (a) removing the cover from the core by:
      (i) heating the golf ball to a temperature above the softening point of the cover;
      (ii) cutting a portion of the circumference of the cover through substantially its entire thickness;
      (iii) forcing the core through said cut portion; and,
   (b) applying a new cover to the core.

9. The method of claim 8 wherein said heating step comprises submerging the golf ball in a heated liquid.

10. The method of claim 8 wherein said cut portion comprises an arc of at least 90°.

11. An apparatus for removing a softenable cover from a golf ball having a softenable outer cover and an inner core, the apparatus comprising:
   means for heating the cover to a temperature above the softening point of the cover;
   means for cutting a portion of the circumference of the cover through substantially its entire thickness; and,
   means for forcing the core through said cut portion.

12. The apparatus of claim 11 wherein said heating means comprises a tank of heated fluid.

13. The apparatus of claim 12 wherein said fluid is water.

14. The apparatus of claim 11 further comprising means for clamping the golf ball while the cover is cut and removed.

15. The apparatus of claim 14 wherein said clamping means comprises two quarter spherical clamp portions, said clamp portions including an inner surface having tooth-like edges protruding therefrom.

* * * * *